Figure 1:
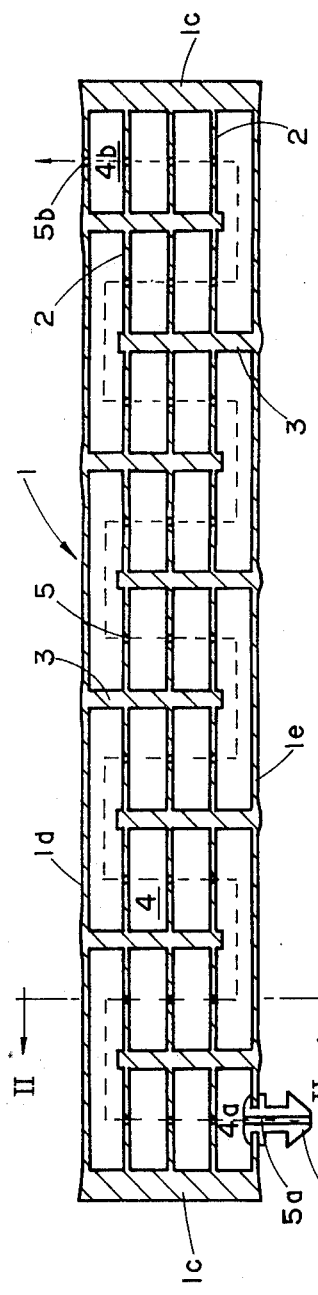

United States Patent [19]

Mehoudar

[11] 3,951,345

[45] Apr. 20, 1976

[54] DRIP LEVEL IRRIGATION

[76] Inventor: Raphael Mehoudar, 36, Yehuda Hanassi, Tel-Aviv, Israel

[22] Filed: Dec. 18, 1974

[21] Appl. No.: 534,063

[30] Foreign Application Priority Data
Dec. 18, 1973 Israel ..................................... 43850

[52] U.S. Cl. ................................................ 239/542
[51] Int. Cl.² ........................................ B05B 15/00
[58] Field of Search ........... 239/542, 450, 145, 547; 61/12, 13; 138/42; 285/13, 14

[56] References Cited
UNITED STATES PATENTS

| | | | |
|---|---|---|---|
| 3,601,320 | 8/1971 | Du Plessis | 239/542 |
| 3,604,728 | 9/1971 | Symcha | 285/14 |
| 3,693,657 | 9/1972 | Olson | 239/542 |
| 3,729,142 | 4/1973 | Garza et al. | 239/542 |
| 3,806,036 | 4/1974 | Olson | 239/542 |
| 3,870,236 | 3/1975 | Barragan | 239/542 |
| 3,873,030 | 3/1975 | Barragan | 239/542 |

Primary Examiner—Lloyd L. King
Attorney, Agent, or Firm—Donald M. Sandler

[57] ABSTRACT

An elongated dripper unit comprising an enclosure sealed at either end thereof and formed with a liquid inlet and outlet, at least one longitudinal partition formed in said enclosure so as to divide the enclosure into at least two sub-enclosures and a plurality of lateral partitions each of which extends laterally across the other enclosure from the enclosure wall to an inner longitudinal partition so as to subdivide each sub-enclosure into a plurality of cells which communicate with each other via reduced-diameter communicating apertures formed in the longitudinal partition(s), said cells including an input cell communicating with said inlet, an output cell communicating with said outlet and a plurality of intermediate cells, a liquid flow path through said unit extending from said input cell to said output cell via said plurality of intermediate cells, the liquid pressure through said unit being progressively reduced as a result of passage through said communicating apertures and as a result of repeated abrupt directional changes, the available cross-sectional flow path through said apertures being substantially less than that through said cells.

10 Claims, 14 Drawing Figures

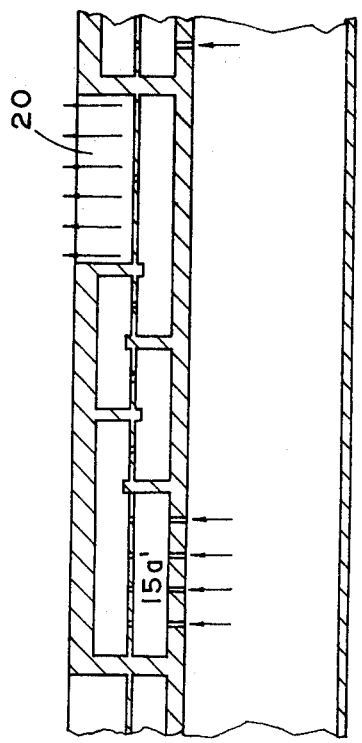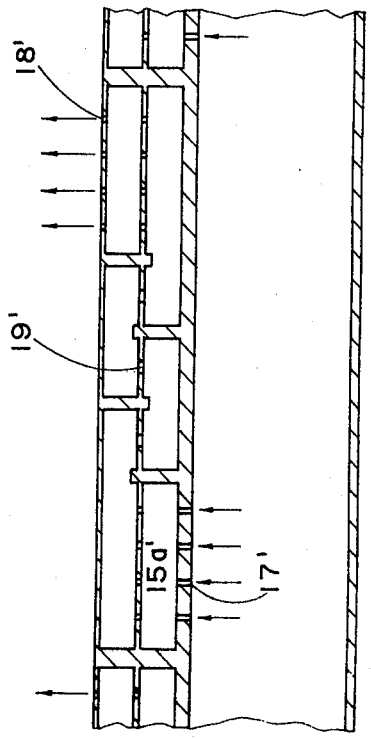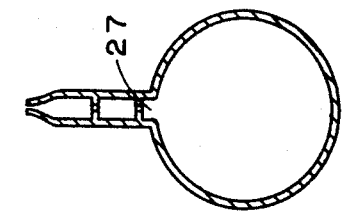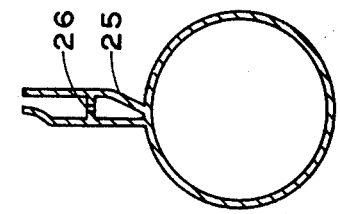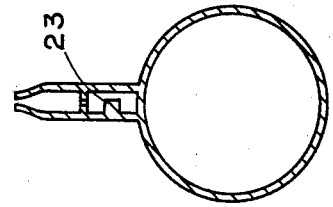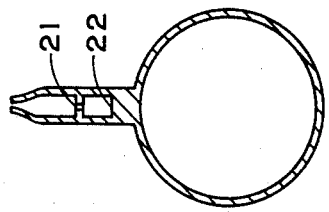

DRIP LEVEL IRRIGATION

This invention relates to drip level irrigation and is particularly concerned with drip level irrigation units capable of being fitted to irrigation systems so as to ensure a drip-like level of discharge at a very low rate of flow and at the required locations.

Drip level irrigation is being more and more employed throughout the world, it having been accepted that this form of irrigation is not only desirable from the point of view of water economy but is also beneficial to the plants being irrigated.

The main problem to be solved when designing a drip level irrigation installation is essentially how a drip level output is to be achieved given a relatively high supply pressure. This problem becomes more acute the higher the initial supply pressure. It is clear, however, that this problem cannot be resolved by merely reducing this initial supply pressure seeing that it is necessary to ensure that, where the installation extends over a substantial area, with possibly differing terrain gradients, water still reaches all regions of the installation and at a substantially uniform rate, despite these gradients and pressure losses in the lines themselves. This can only be ensured if the supply pressure through the system is considerable as compared with the pressure differences due to the terrain and the pressure losses in the lines. Thus, if in practice the magnitude of pressure variations due to differing gradients as well as to pressure losses in the lines were to exceed 20% of the magnitude of the supply pressure, there would be very substantial variations in the outflow rates.

Various proposals have been made to achieve such an effective drip level discharge with a sufficiently high supply pressure. In accordance with one such set of proposals the reduction in supply pressure so as to obtain the drip-like discharge is achieved by forcing the irrigating liquid to pass through very small discharge outlets or apertures, the smaller the outlet aperture the lower the flow rate for a given supply pressure. A proven disadvantage of this set of proposals arises from the very smallness of the discharge outlets, which smallness leads to their becoming blocked as a result of the presence of grit or other impurities in the irrigating liquid or as the result of ingress of grit or sand from the surrounding area. This danger has hitherto placed a lower limit on the dimensions of the discharge outlets of such drip level installations.

These disadvantages have led to the development of a further set operation proposals in accordance with which the flow rate is reduced as a result of the passage of the outflowing irrigating liquid along elongated outflow paths and as consequence of the frictional resistance to flow experienced by the irrigating liquid along these outflow paths. With such a construction the actual outlet apertures can be substantially greater than is the case wherein the entire reduction in flow rate is effected as result of flow through a restricted outlet aperture. Whilst drip level installations and their associated units designed in accordance with this further set of prior proposals show distinct advantages in operaion over those designed in accordance with the first mentioned set, these units are nevertheless relatively complicated in construction very often involving the production and assembly of separate interfitting parts.

Furthermore with units having such elongated flow paths, the flow of the liquid therethrough tends to be largely laminar and the outputs from such units are very sensitive to variations in the supply pressure.

It is an object of the present invention to provide for a dripper unit in which the above referred to disadvantages are substantially reduced.

According to the present invention there is provided an elongated dripper unit comprising an enclosure sealed at either end thereof and formed with a liquid inlet and outlet, at least one longitudinal partition formed in said enclosure so as to divide the enclosure into at least two sub-enclosures and a plurality of lateral partitions each of which extends laterally across the outer enclosure from the enclosure wall to an inner longitudinal partition so as to subdivide each subenclosure into a plurality of cells which communicate with each other via reduced-diameter communicating apertures formed in the longitudinal partition(s), said cells including an input cell communicating with said inlet, an output cell communicating with said outlet and a plurality of intermediate cells, a liquid flow path through said unit extending from said input cell to said output cell via said plurality of intermediate cells, the liquid pressure through said unit being progressively reduced as a result of passage through said communicating apertures and as a result of repeated abrupt directional changes, the available cross-sectional flow path through said apertures being substantially less than that through said cells.

The dripper unit can be formed separately of the main irrigation pipe to which it can be subsequently coupled by suitable coupling means. Alternatively the dripper unit can be formed integrally with the main irrigation pipe in which case a blank comprising the pipe and dripper unit enclosure can be formed as an extruded unit. Subsequently the dripper unit enclosure can be formed into separate units by sealing and aperturing operations, the latter being preferably carried out using a laser beam.

In all cases the water, in passing from the main irrigation pipe into and through the dripper units passes through the cells and the communicating apertures and consequently undergoes repeated contractions and expansions. In doing so, and as a result of the numerous and repeated directional changes most of the kinetic energy of the flow is dissipated and the flow pressure of the water is steadily and effectively reduced so that outflow takes place at a drip rate. The kind of flow which takes place through the unit is much less pressure sensitive, and furthermore the turbulence introduced into the flow also militates against settling of sediment etc., and the consequent danger of blockage. Furthermore the cell-like construction of the unit is conducive to any sediment etc. remaining in one or more of the downstream cells and thus is not carried forward so as to block the communicating or outlet apertures.

Figure 2:
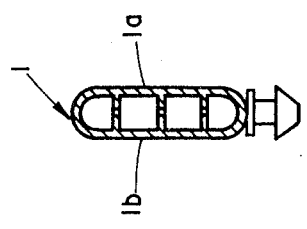
Figure 3:
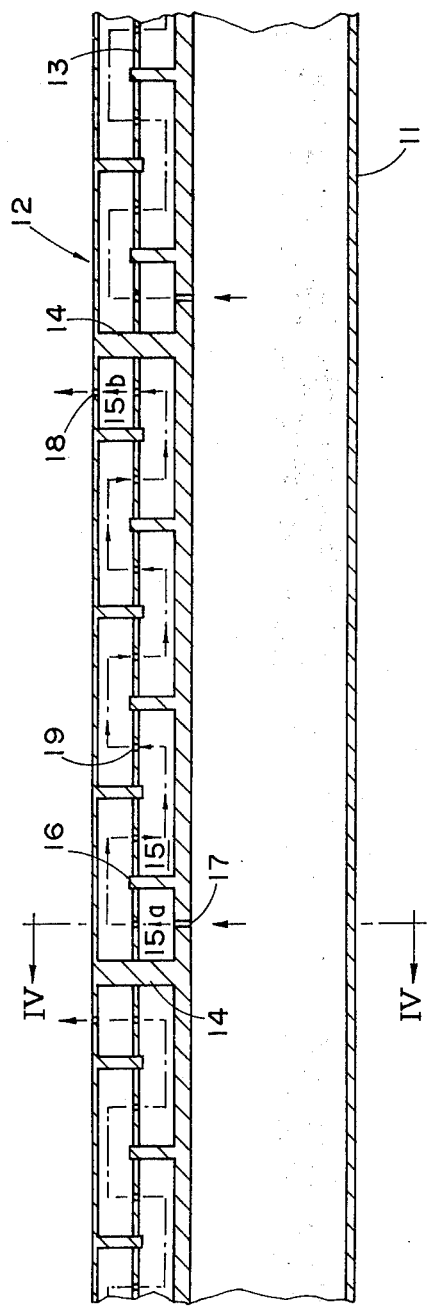
Figure 4:
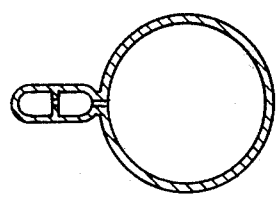

Various embodiment of drip units in accordance with the present invention will now be described by way of example and with reference to the accompanying drawings in which:

FIG. 1 is a longitudinally sectioned representation of a drip unit in accordance with the present invention formed separately from and adapted to be fitted to an irrigation pipe, FIG. 2 is a cross-sectional view of the dripper unit shown in FIG. 1 taken along the line II—II, FIG. 3 is a longitudinally sectioned view of an integrally formed combined dripper unit and irrigation pipe, FIG. 4 is a cross-sectional view of the combination shown in FIG. 3 taken along the line IV—IV, FIGS. 5 and 6 are longitudinally sectioned views of modified forms of combined dripper units and irrigation pipes in accordance with the present invention, and FIGS. 7 to 14 are schematic cross-sectional views of respective forms of combined irrigation pipe and dripper unit blanks for use in forming combinations in accordance with the present invention.

As seen in FIGS. 1 and 2 of the drawings a dripper unit comprises a tubular enclosure 1 having a pair of substantially parallel longitudinal enclosure walls 1a and 1b the enclosure being sealed at either end by transverse end seals 1c. Formed within the enclosure and extending in the longitudinal direction thereof is a plurality of parallel, spaced apart longitudinal partitions 2. Extending along the length of the enclosure is a plurality of transverse partitions or seals 3 which extend alternately from opposite transverse walls 1d and 1e of the enclosure to the remote longitudinal partition. In this way the enclosure is divided into a plurality of successive cells 4 communication between successive cells being via narrow dimensioned apertures 5 formed in the longitudinal partitions.

One of the cells 4a constituted an input cell and communicates with an input aperture 5a formed in the wall of the housing and in which is fitted a correspondingly apertured coupling nipple 6. Another of the cells 4b remote from the input cell 4a constitutes an output cell and communicates with an output aperture 5b formed in the wall of the enclosure 1.

When the dripper unit shown in FIGS. 1 and 2 is fitted to a main irrigation pipe (the nipple 6 thereof being inserted into a corresponding aperture formed in the pipe) irrigation water flows through the unit in the direction of the chain dotted line from the input cell 4a to the output cell 4b and emerges from the unit as a driplike discharge through the outlet aperture 5b. The flow of the irrigation liquid through the unit is accompanied by the constriction of the passage of the liquid as it passes through the narrow dimensioned communicating apertures 5 and the subsequent expansion of the flow path in the succeeding cell. In addition the flow of the liquid is accompanied by repeated and abrupt directional changes and all these factors taken together result in the progressive dissipation of the kinetic energy of the water flow through the unit and the resultant reduction in the flow pressure so that the water emerging from the outlet aperture 5b does so as a substantially pressureless drip. In addition an increasing degree of turbulence is introduced into water flow through the unit and with turbulent flow the outflow rate varies substantially only in accordance with the square root of the pressure variations in the supply pressure of the water flowing through the irrigation pipe. Additionally, this turbulence tends to prevent the settling of any sediment in the throughflowing water which could otherwise lead to the blockage of the apertures.

Whilst in the embodiment shown in FIGS. 1 and 2 of the drawings the dripper unit in accordance with the present invention is formed as a separate unit adapted to be coupled to the main irrigation pipe in the embodiments shown in the remaining drawings the irrigation unit is formed integrally with an irrigation pipe. Thus as seen in FIGS. 3, 4, 5 and 6 of the drawing there is formed, integrally with an irrigation pipe 11, an elongated tubular enclosure 12 which extends longitudinally of, and parallel to, the longitudinally axis of the pipe 11. The tubular enclosure 12 is provided with a single longitudinal partition 13 and is divided into successive dripper units by transverse partitions or seals 14 each unit being in its turn subdivided into cells 15 by means of transverse partitions or seals 16 which extend alternately from opposite walls of the enclosure 12 to or just beyond the longitudinal partition. As before, each unit comprises an inlet cell 15a communicating with the main irrigation pipe 11 via an inlet aperture 17 and an outlet cells 15b formed with an outlet aperture 18. The intermediate cells communicate with each other via apertures 19 formed in the longitudinal partition. The flow of the irrigation water from the main pipe 11 to the respective outlets is shown in the drawing in chain dotted lines.

IN the modifications shown in FIGS. 5 and 6 of the drawings the input cells 15a' are provided with a plurality of input apertures 17' which are of lesser diameter than the diameters of the communicating apertures 19' formed in the longitudinal partition and in this way the input apertures 17' of the input cell serve as an effective filter preventing the passage from the irrigation pipe into the dripper unit of material which would tend to clog the dripper units proper. On the other hand, the embodiment shown in FIG. 5 of the drawings the output cell is provided with a plurality of output apertures 18' thereby minimizing the risk that the outflow from the output cell would be entirely blocked (by external causes) which could be the case if only a single output aperture were provided.

In the embodment shown in FIG. 6 of the drawings the output cell is provided, in a manner which will become clear after a discussion of the mode of forming the combined dripper unit and irrigation pipe, with an elongated slitlike outlet aperture 20.

The provision of a combined irrigation pipe and a series of elongated dripper units can readily be effected using conventional extrusion techniques. The combination can be extruded with the dripper unit enclosure (together with its longitudinal partition(s)) having its upper edge already sealed as shown in FIG. 4 of the drawings. The communicating apertures in the longitudinal partition(s) together with the inlet and outlet apertures are subsequently formed for example, by means of a laser beam which is directed from outside the enclosure through the enclosure walls. Such laser beam boring techniques can be used selectively to aperture the longitudinal partition(s) without aperturing the irrigation pipe except where required. However, it will be readily appreciated that the use of such techniques involves the simultaneous aperturing of the outer enclosure wall. In consequence, and subsequently, all the apertures formed in the outer enclosure wall apart from the outlet apertures have to be sealed. The provision of the inter-unit partitions or seals as well as the inter-cell partitions or seals can be effected by heat welding the partitions or seals as well as the inter-cell partitions or seals can be effected by heat welding the enclosure at required intervals.

Alternatively, directly after extrustion of the dripper unit integrally with or separately from the irrigation pipe, and when the unit walls are still not it is possible to effect the provision of the inter-unit partitions or seals as well as the inter-cell partitions or seals by means of welding (possibly without additional heating)

and subsequently to effect the necessary aperturing and sealing.

As an alternative the combined irrigation pipe and dripper unit enclosure can be extruded in the form of a blank consisting of the irrigation pipe and a pair of opposite enclosure walls which are not united at their upper edge and their integrally formed longitudinal partition(s). Such blanks are illustrated in FIGS. 7 to 12 of the drawings. The provision of such blanks allows for the ready aperturing of the longitudinal partition(s) and, where required the pipe wall through the open end of the enclosure whereupon, and subsequently the open end of the enclosure can be sealed leaving the outlet apertures as required. At the same time the lateral inter-cell and inter-unit seals can be effected. The various embodiments shown in FIGS. 7 to 11 of the drawings show the various constructions which can be adopted particularly with a view to aiding the selective aperturing of the longitudinal partition without at the same time aperturing the pipe wall except where required. Thus, in the simplest embodiment shown in FIG. 7 of the drawings the longitudinal partition 21 is apertured by laser beam drilling care being taken to ensure that the intensity and duration of the laser beam is limited so as to avoid aperturing the pipe wall except where required.

In FIG. 8 the adjacent pipe wall 22 is shown thickened thus minimising against the risk that whilst aperturing the longitudinal partition 21 the pipe wall is also apertured. Additionally this thickened wall portion is effective in ensuring that the enclosure is not detached from the pipe when the lateral sealing is effected (see below with reference to FIG. 12).

In FIG. 9 an interposed rib 23 is shown which again safeguards the pipe wall from being apertured whilst the longitudinal partition is being apertured. In FIG. 10 an alternative arrangement is shown in which the longitudinal partition 24 is disposed at an oblique angle with respect to the elongated walls of the enclosure in such a way that the direction of the laser beam designed to aperture the longitudinal partition cannot strike the pipe wall without first of all having to pass through an elongated thickness of the enclosure wall. In this way the chances of aperturing the pipe when the longitudinal partition is being apertured are reduced.

In the embodiment shown in FIG. 11 of the drawings the portion 25 of the enclosure wall between the irrigation pipe and the longitudinal partition 26 is disposed at an acute angle with respect to the longitudinal partition. In this way it can be ensured that, during the aperturing of the longitudinal partition 26 by the laser beam, the latter strikes the enclosure wall so as to encounter a substantial effective thickness and so the irrigation pipe itself is not apertured. If however the enclosure wall portion is accidentally apertured such aperturing can be readily observed and subsequently sealed.

In all the embodiments shown in FIGS. 4 to 11 of the drawings, heat or r.f. welding is employed so as to form the inter-unit partitions or seals and the inter-cell partitions or seals. In order to facilitate the forming of such seals without at the same time damaging the connection between the enclosure and the pipe it may be desirable to adopt a construction as shown in FIG. 12 of the drawings wherein the pipe wall 27 which separates the pipe from the enclosure proper is offset within the enclosure. In this way the subsequent transverse sealing of the enclosure does not carry with it the danger of introducing an undue strain in the connection between the enclosure and the pipe. As indicated above, this undue strain is also protected against with the construction as shown in FIG. 8.

With the effecting of the aperturing in the longitudinal partition and where required in the pipe wall the upper free edges of the enclosure walls can be secured together by heat sealing, mending or the like provision being made for the outlet apertures. In the latter case and as shown in FIG. 6 of the drawings, the free edges of the enclosure wall adjacent the outlet cell can be left unsealed and in this way these free edges define an elongated outlet aperture and its construction is such as to serve as a filter against blockage from external sources.

It should be understood that the various specific features of the differing embodiments which have been described above with reference to the drawings can be suitably combined in differing combinations.

Thus, for example, whilst the construction of dripper unit enclosures having an open edge (so as to facilitate longitudinal partition aperturing) has been described specifically with reference to integrally formed irrigation pipe dripper units, this construction is equally applicable to the case of the dripper unit which constitutes a separate entity to be subsequently coupled to the irrigation pipe.

The precautions taken with the "open edge" enclosure so as to reduce the danger of aperturing the irrigation pipe wall (specified with reference to FIGS. 8 to 11 of the drawings) can also be adopted with the so called closed enclosure construction, i.e., where the enclosure is extruded together with the pipe with its upper edge already closed.

Similarly, the construction illustrated in FIGS. 8 and 12 and which serve to withstand the strain exerted during lateral sealing operations are also applicable in the so-called "closed" enclosure constructions.

The construction of the dripper units with a plurality of longitudinal partitions as described and illustrated with reference to the integral dripper unit (FIGS. 1 and 2) is equally applicable to the combined dripper unit-irrigation pipe construction. Thus with a dripper unit having a plurality of longitudinal partitions, effecting a number of lateral seals and apertures (equal to that required for a unit having a single longitudinal partition) results in the production of a substantial number of cells which is in fact a multiple of the number which would be produced for the same length of unit having only a single longitudinal partition.

Furthermore it will be realised that whilst in all the constructions described above with reference to the drawings, the dripper unit enclosure has been uniformly divided along its entire length by means of lateral seals into uniformly spaced apart cells, there is no absolute requirement for such uniform sub-division and, in point of fact a portion of the dripper unit length can be left undivided (e.g. the downstream end) thereby reducing, as required the number of cells and the consequent resistance to flow.

It will be appreciated that the dripper unit construction in accordance with the present invention, whether in the form of separate units or whether combined with the irrigation pipe lends itself to continuous production techniques with their consequent overall economies. Furthermore the particular multiple cell construction herein employed which can involve units comprising scores of cells, leads to the attainment of minimal output rates and also ensures that any sediment or the like in the liquid flow settles in one of the early downstream cells and is not carried on to block through-flow. On the other hand the flow paths through the units are such that should a communicating aperture in any unit become blocked, the entire flow pressure is available to unblock the aperture.

Figure 13:
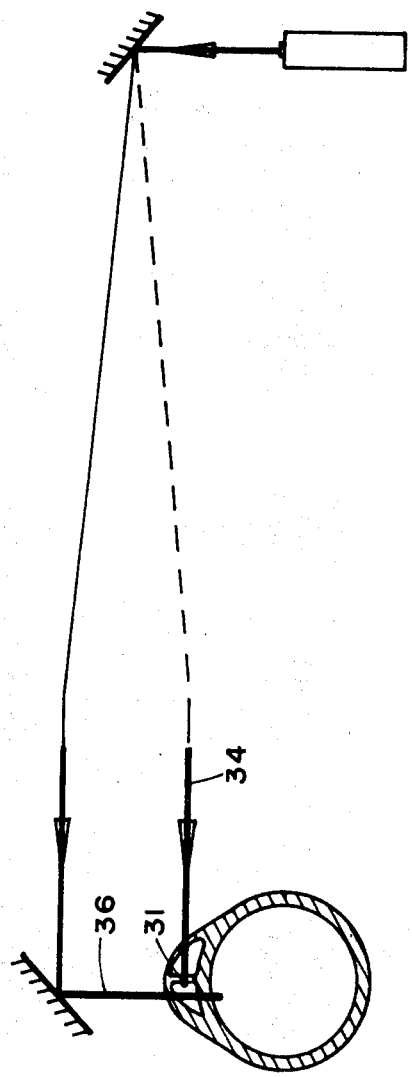
Figure 14:
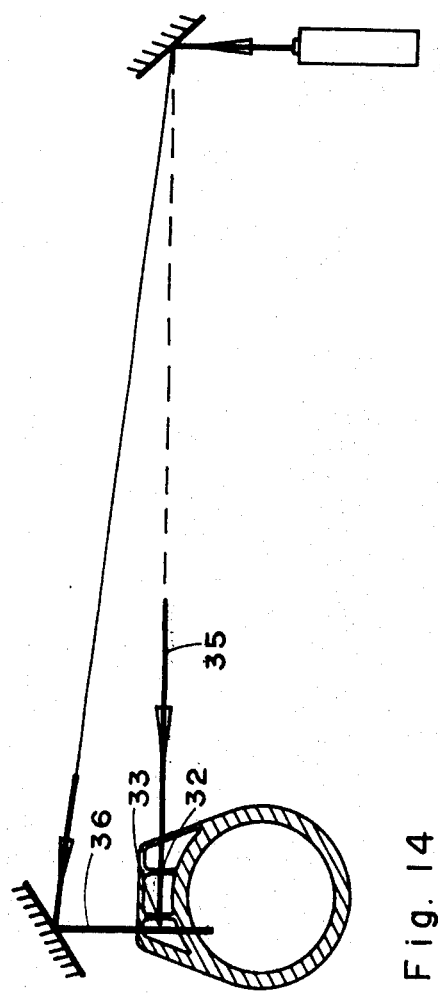

Whilst in the embodiments specifically described above, the dripper units, whether formed integrally with, or separately from the irrigation pipe are divided by the longitudinal partition(3) into sub-enclosures which are respectively, juxtaposed or stacked with respect to the pipe, in the embodiments shown in FIGS. 13 and 14 of the drawings the sub-enclosures extend transversely along the width of the pipe.

FIG. 13 shows a cross-sectional view of an integrally formed pipe and dripper unit having one longitudinal partition 31 serving to divide the unit into two sub-enclosures whilst the integrally formed pipe and dripper unit shown in FIG. 14 has two longitudinal partitions 32 and 33 serving to divide the unit into three sub-enclosures. The units are, as in the embodiments described above, provided with lateral partitions (not shown) serving to divide each sub-enclosure into individual cells.

The specific types of constructions shown in FIGS. 13 and 14 are particularly advantageous in connection with the use of lasers for aperturing the longitudinal partitions. Thus in FIG. 13 the intensity of a laser beam 34 can be chosen to penetrate one outer wall of the unit (the aperture thus formed being subsequently sealed) and the longitudinal partition 31. In FIG. 14 the intensity of a laser beam 35 can be chosen to penetrate one outer wall and both longitudinal partitions 32 and 33. In neither case is it possible however for this beam to aperture the pipe wall and, in consequence, the precautions which have to be adopted in the previously described embodiments to avoid such aperturing are rendered unnecessary. On the other hand, when it is required to aperture the pipe wall a laser beam 36 can be used for this purpose as and when required

I claim:

1. An elongated dripper unit including at least one elongated enclosure having walls disposed generally parallel to the longitudinal axis thereof and being sealed at either end thereof, each enclosure comprising:
    a liquid inlet;
    a liquid outlet;
    at least one longitudinal partition disposed in said enclosure so as to divide said enclosure into at least two sub-enclosures;
    a plurality of lateral partitions disposed in relative spaced relationship with respect to each other, each lateral partition extending across one of said sub-enclosures thereby to divide each of said sub-enclosures into a plurality of cells including an input cell communicating with said liquid inlet, an output cell communicating with said liquid outlet and a plurality of intermediate cells;
    a plurality of liquid communication apertures of reduced diameter formed in said at least one longitudinal partition intermediate said lateral partitions, said apertures and said lateral partitions being arranged so as to permit sequential liquid communication from said input cell through said intermediate cells and to said output cell and defining a liquid flow path including a plurality of abrupt direction changes, the available cross-sectional liquid flow capacity of said apertures being substantially less than that of said cells, said liquid flow path thereby creating a negative liquid pressure gradient between said liquid inlet and said liquid outlet.

2. A dripper unit according to claim 1, wherein said lateral partitions extend alternately from opposite enclosure walls.

3. A dripper unit according to claim 2, wherein each lateral partition extends from an enclosure wall to the longitudinal partition remote therefrom.

4. A dripper unit according to claim 1 wherein the outlet cell is formed with a plurality of outlet apertures.

5. A dripper unit according to claim 1, wherein said inlet communicates with a coupling means for coupling said unit to an irrigation pipe.

6. A dripper unit according to claim 5, wherein said coupling means is constituted by a coupling nipple adapted to be introduced into an aperture formed in said irrigation pipe.

7. In combination a dripper unit according to claim 1, and an irrigation pipe, said enclosure and associated longitudinal partition(s) being formed integrally with the pipe.

8. A combination according to claim 7, wherein successive units extend continuously along the length of said pipe, the trailing sealed end of one unit forming the leading sealed end of the successive unit.

9. A combination according to claim 7, wherein said inlet is formed of an inlet aperture formed in said pipe adjacent said inlet cell.

10. A combination according to claim 7, wherein said inlet is formed of a plurality of inlet apertures formed in said pipe adjacent said inlet cell, said inlet apertures being of narrower dimensions than those of the communicating apertures.

* * * * *